United States Patent [19]

Waddill et al.

[11] 4,421,906
[45] Dec. 20, 1983

[54] WATER-BASED EPOXY RESIN COATING COMPOSITION

[75] Inventors: Harold G. Waddill; Kathy B. Sellstrom, both of Austin, Tex.

[73] Assignee: Texaco Inc., White Plains, N.Y.

[21] Appl. No.: 434,685

[22] Filed: Oct. 15, 1982

[51] Int. Cl.³ .................... C08G 59/60; C08G 59/54
[52] U.S. Cl. ............................ 528/111; 528/111.3; 523/417
[58] Field of Search .......................... 528/111, 111.3

[56] References Cited

U.S. PATENT DOCUMENTS

| | | | |
|---|---|---|---|
| 3,496,138 | 2/1970 | Sellers et al. | 528/111 |
| 3,645,969 | 2/1972 | Harvey | 528/111 |
| 4,167,498 | 9/1979 | Waddill | 523/414 |
| 4,179,418 | 12/1979 | Waddill | 528/111 X |

*Primary Examiner*—Earl A. Nielsen
*Attorney, Agent, or Firm*—Robert A. Kulason; Jack H. Park; Richard A. Morgan

[57] ABSTRACT

A water based epoxy resin composition is disclosed. The epoxy resin is useful in protective coatings. The composition comprises a modified diglycidyl ether of a bisphenol A type epoxy resin with a polyamidopolyamine in aqueous medium. The diglycidyl ether of bisphenol A is modified by partial reaction with a polyoxyalkyleneamine. The polyamidopolyamine is prepared from dimer fatty acids and a polyamine.

15 Claims, No Drawings

WATER-BASED EPOXY RESIN COATING COMPOSITION

BACKGROUND OF THE INVENTION

1. Field of the Invention

This invention relates to the field of water based epoxy resins. It particularly relates to modified glycidyl ethers of bisphenol A type resins which are useful as coatings.

2. Prior Art

Water based epoxy resins are known in the art. Prior art water based epoxy resins generally utilize an emulsifier and an organic solvent in their formulation. The presence of organic solvent provides a problem because of volatile solvent release. Therefore, those skilled in the art have sought to provide a water based epoxy resin which is free of the difficulties inherent in using large amounts of organic solvents. In U.S. Pat. No. 3,998,771 a process is disclosed whereby a carboxylic acid is reacted with a primary amine to form an amide. This amide is then reacted in excess with an epoxy resin and the product is water dispersed and further reacted with enough epoxy resin to stoichiometrically cure the resin.

Emulsification of water based epoxy resins is not without its difficulties. Emulsification of the polar epoxy resins with surfactants or emulsifying agents is in fact generally quite difficult. All surfactants or emulsifiers promote hydrolysis of epoxy groups in water systems. This generally leads to poor emulsification stability, poor freeze-thaw stability, usually a phase inversion with addition of curing agent and poor pigment stability. Surfactants and emulsifiers, if added to an epoxy system, usually become incompatible after curing and exude to the coating surface forming blemishes or blushed coatings.

A water reducible coating system is described in U.S. Pat. No. 4,167,498 which is prepared by combining a bisphenol A epoxy resin with a polyamide prepared from fatty acids and an amino propyl derivative of a polyoxyalkylene polyamine.

U.S. Pat. No. 4,308,183 describes a water borne coating employing a bisphenol A epoxy resin produced by addition of an ethoxylated nonylphenol and a long chain organic phosphatide.

U.S. Pat. No. 4,315,044 describes a self-emulsifying epoxy resin employing the diglycidyl ether of bisphenol A, bisphenol A and the diglycidyl ether of polyoxyalkylene glycol in aqueous medium.

It is well known in the art that there is a need for water reduced coating systems which minimize the use of hazardous or polluting solvents and produce high gloss clear and pigmented coatings.

SUMMARY OF THE INVENTION

The invention comprises a two part water borne epoxy resin composition, which part are kept separated, but mixed prior to use. The first part, hereinafter referred to as Part A or base resin, comprises a diglycidyl ether which comprises a condensation product of epichlorohydrin with a bisphenol A type resin or derivative thereof. The diglycidyl ether is partially reacted with polyoxyalkyleneamine of molecular weight of about 900 to about 5000. The second part, hereinafter referred to as Part B or curing agent, comprises a reactive polyamidopolyamine formed from reaction of multifunctional carboxylic acids, esters, anhydrides and mixtures thereof with a polyfunctional amine which may be aliphatic, cycloaliphatic or aromatic in structure or a mixture thereof.

DESCRIPTION OF THE PREFERRED EMBODIMENTS

The present invention is a two part water borne epoxy resin coating consisting of; a modified bisphenol A type epoxy resin and an aqueous solution of an amidopolyamine. The epoxy resin is modified by partial reaction with a polyoxyalkyleneamine. The modified epoxy resin with polyoxyalkyleneamine reacted with it, becomes the emulsifier while at the same time, retaining much of its epoxy functionality. The modified resin is, therefore, an emulsifier as well as a reactive epoxy resin. This is an improvement over the prior art which typically requires non-reacting emulsifiers, e.g. nonylphenoxy[ethyleneoxy]ethanols to form water-reduced systems. The use of a solvent such as isopropanol is optional.

Part A of the two part composition of the present invention comprises an epoxy base resin. The preferred epoxy base resin is a modified bisphenol A type epoxy resin.

The bisphenol A type epoxy resin can be any of the well known epoxy resins prepared from bisphenol A or derivatives thereof having an epoxy equivalency of more than one. Preferably, the epoxy resin, which has an epoxide equivalent weight of from 175 to 195, is derived from condensing epichlorohydrin with 2,2-bis(p-hydroxyphenyl)propane to form a derivative of bisphenol A, such as 2,2-bis[p-(2,3-epoxypropoxy)-phenyl]propane.

The bisphenol A type epoxy resin or derivative thereof is modified by partially reacting it with from about 5 wt% to about 50 wt% and preferably about 5 wt% to about 15 wt% of a polyoxyalkyleneamine. The polyoxyalkyleneamine is preferably a block copolymer of ethylene oxide and propylene oxide terminated with primary amino groups and is preferably a monoamine or diamine. However, in the Examples is shown a polyoxypropyleneamine which effectively emulsifies the epoxy resin.

A group of polyoxyalkylene diamines has been found that demonstrates beneficial properties. The structure of this group of diamines is characterized by the general formula:

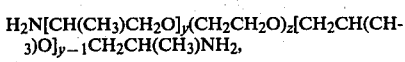

wherein y is an integer of from 1 to 5 and z is an integer of from 1 to 50. Polyoxyalkylene diamines in this group have molecular weights of from about 900 to about 5000 and preferably about 1000 to about 2000. This group of diamines, in general terms, consists of copolymer blocks of oxyethylene groups ($-CH_2CH_2O-$) and oxypropylene groups ($-OCH_2CH(CH_3)-$) terminated with primary amine groups. Diamines of this type are marketed by Texaco Chemical Co., Inc. under the trademark JEFFAMINE ® ED-series.

Another useful epoxy resin modifier may be classified as a polyoxyalkylene monoamine. A group of polyoxyalkylene monoamines has been found that demonstrates beneficial properties and is characterized by the general formula:

$$CH_3O(CH_2CH_2O)_r[CH_2CH(CH_3)O]_sCH_2CH(CH_3)NH_2$$

wherein r is an integer of from about 16 to about 20 and s is an integer of from 1 to about 5.

This group of polyoxyalkylene monoamines has a molecular weight of from about 900 to about 1100.

Typical of the polyoxyalkylene monoamine which may be used in the practice of the present invention is the mixed polyoxypropylene and polyoxyethylene monoamine of molecular weight 1000 characterized by the average formula:

$$CH_3O(CH_2CH_2O)_{18.6}[CH_2CH(CH_3)O]_{1.6}CH_2CH(CH_3)NH_2$$

Monoamines of this type are marketed by Texaco Chemical Co., Inc. under the trademark JEFFAMINE ® M-series.

It has been found that polyoxyalkyleneamines of molecular weight from about 900 to about 5000 and preferably about 1000 to about 2000 produce a group of emulsifiable, water borne epoxy resins demonstrating superior qualities for a coating material as shown in the Examples. It has been found that polyoxyalkyleneamines of molecular weight less than about 900 do not produce good water reduced epoxy resins.

Part B of the two part composition of the present invention comprises a reactive water compatible polyamido polyamine prepared from reaction of multifunctional carboxylic acids, esters, anhydrides and mixtures thereof with a poly functional amine which may be aliphatic, cycloaliphatic or aromatic in structure or a mixture thereof.

The polyamidopolyamine used for curing is a product of reacting a dimer acid with an ethyleneamine, i.e. triethylenetetramine ($H_2NCH_2CH_2NHCH_2CH_2NHCH_2CH_2NH_2$). The dimer acid is a polymeric fatty acid obtained by polymerization of an olefinically unsaturated monocarboxylic acid containing 16 to 24 carbon atoms; i.e. oleic, linoleic, linolenic acids or mixtures thereof. Preparation of these dimer acids is described in U.S. Pat. Nos. 2,793,219 and 2,955,121. Typically a $C_{18}$ acid is reacted to produce a $C_{36}$ dimer acid. Ratios of dimer acid and ethyleneamine are such that the resulting polyamidopolyamine is compatible with the epoxy system and forms a stable water dispersion when mixed with the modified epoxy resin.

Compounds containing carboxyl groups, i.e., carboxylic acids, esters, anhydrides or mixtures of these are suitable in this invention for preparation of the polyamidopolyamine curatives. Preferred acids are high molecular weight hydrocarbon acids having from 18-54 carbon atoms with 2-3 carboxyl groups. Suitable polycarboxylic acids are dimer and trimer acids produced commercially by polymerization of unsaturated $C_{18}$ fatty acids. A typical curative agent is the condensation product of a polyamine with a dimer fatty acid. The condensation is expressed as follows:

Dimer Fatty Acid + Diethylenetriamine ⟶ Polyamide Resin $$nHOOCC_{34}H_{62}COOH + 2H_2NC_2H_4NHC_2H_4NHC_2H_4NH_2 \longrightarrow$$

$$H_2NC_2H_4HNC_2H_4NHC_2H_4NH[\overset{O}{\overset{\|}{C}}C_{34}H_{62}\overset{O}{\overset{\|}{C}}]NHC_2H_4NHC_2H_4NHC_2H_4NH_2$$

The curative used in Example Ib, VERSAMID ® 140 is reported (*Epoxy Resin Technology*, Paul F. Bruins, 1968, p. 80) to be formed from condensation of one mole of dimer acid with two moles of triethylenetetramine.

The carboxylic acid or derivatives as previously defined and poly functional amine are combined in proper ratios to form a polyamide. The ratios of component carboxylic acid derivative will vary depending upon the nature of each component and one skilled in the art can determine optimum ratios of the components. Epoxy base resin and water are mixed to form a compatible solution. The polyamidopolyamine is added and the mixture is stirred until homogeneous. The polyamidopolyamines may be added in a water soluble solvent. A water soluble solvent such as isopropanol may be added to adjust the viscosity of the mixture. The mixture is then brushed onto a surface and allowed to cure and form a film.

For curing epoxy resins, the curing agent is usually added in such an amount that there is one reactive NH group in the curing component for each epoxy group in the epoxy resin component. These are known as stoichiometric quantities. The stoichiometric quantity can be calculated from the knowledge of the chemical structure and analytical data on the component.

For the purposes of the present invention, the stoichiometric amount of hardeners is calculated by adding together the number of equivalents (on the basis of weight percent replaceable NH groups). In general, it is advantageous to use up to 10% excess of the curing agent over the stoichiometric amount.

The curing temperature range acceptable in this invention is from about 20° C. to about 60° C. Post cures of temperatures up to about 150° C. are optional.

The present invention after curing, produces high gloss clear coatings. Optionally pigments can be added to produce high gloss colored coatings.

The following Examples illustrate the usefulness of the disclosed invention but are not intended to limit the scope thereof.

EXAMPLE Ia

| Preparation of Modified Epoxy Resin | |
|---|---|
| Reactants | |
| Liquid epoxy resin (WPE ~ 185)[1] | 100 pbw. |
| JEFFAMINE ® ED-2001[2] | 10 pbw. |

The epoxy resin was heated to 125° C. while stirring under a nitrogen purge. The amine was added rapidly. Temperature was maintained at below 150° C. After addition was completed, the reaction temperature was maintained for one hour. The product was cooled and packaged. Properties of product were:

| | |
|---|---|
| Brookfield viscosity, cps., ~25° C. | 15750 |
| Total amine, meq./g. | 0.08 |
| Epoxide content, meq./g. | 4.81 |

-continued

| Preparation of Modified Epoxy Resin | |
|---|---|
| Reactants | |
| Weight per epoxide (WPE) | 208 |

[1]weight per epoxide (WPE)
[2]JEFFAMINE ® ED-2001 structure:
O—[(CH$_2$CH$_2$O)$_A$ (CH$_2$CH(CH$_3$)O)$_B$ (CH$_2$CH(CH$_3$)NH$_2$)]$_2$
A = 20.9; B = 0.75

EXAMPLE Ib

| Water Based Clear Coating from Modified Epoxy Resin of Example Ia | |
|---|---|
| A. Base Resin Mixture | |
| Epoxy resin: ED-2001 Adduct (Example Ia) | 82 pbw. |
| Water | 60 pbw. |
| Isopropanol | 10 pbw. |
| Nonionic defoamer[1] | 1.3 pbw. |
| B. Hardener Mixture | |
| Polyamidopolyamine[2] | 50 pbw. |
| Glycol ether[3] | 20 pbw. |
| Glycol ether acetate[4] | 10 pbw. |

A and B mixed and allowed to stand one half hour. Added 130 g 4:1 water:isopropanol mixture for thinning purposes. Applied with variable blade applicator.

| Water Based Clear Coating from Modified Epoxy Resin of Example Ia | |
|---|---|
| Properties of Coating | |
| Drying time[5], 5 mil (wet) thickness, 1.5 mil dry thickness | |
| Set-to-touch time, hrs. | 1.0 |
| Surface-dry time, hrs. | 7.0 |
| Thru-dry time, hrs. | 16.1 |
| Pencil hardness[6] after 24 hrs., ~25° C. | <3B |
| 7 days, ~25° C. | HB |
| Direct/reverse impact[7] in-lbs. to fail | |
| Cure: 24 hrs., ~25° C. | >160/>160 |
| 7 days, ~25° C. | >160/>160 |
| 60° gloss[8] | 113.1 |
| Cross hatch adhesion[9], 7 day cure @ ~25° C. | 100% |

[1]BALAB ® 618 (Witco Chemical Co., Organics Division)
[2]VERSAMID ® 140 (Henkel)
[3]JEFFERSOL ® EB; Ethylene glycol monobutyl ether, a glycol ether solvent product of Texaco Chemical Co.
[4]Ethylene glycol monoethyl ether acetate; CELLOSOLVE ® acetate (Union Carbide)
[5]Gardner circular drying time recorder
[6]ASTM D3363-74
[7]ASTM G14-72
[8]ASTM D523
[9]ASTM D3359-74

EXAMPLE IIa

| | Preparation of Modified Epoxy Resins for Water-Borne Formulations | | | | | |
|---|---|---|---|---|---|---|
| | A | B | C | D | E | F |
| Reactants | | | | | | |
| Liquid Epoxy resin (WPE ~ 185) | 100 | 100 | 100 | — | 100 | 100 |
| Hydrogenated BPA Liquid[1] epoxy resin (WPE ~ 235) | — | — | — | 100 | — | — |
| JEFFAMINE ® ED-2001[2] | 30 | — | 5 | 10 | 10 | — |
| JEFFAMINE ® M-1000[3] | — | 10 | — | — | — | — |
| JEFFAMINE ® D-2000[4] | — | — | — | — | — | 20 |
| Properties of Product | | | | | | |
| Brookfield viscosity, cps., ~25° C. | 18750 | 9850 | 17500 | 3870 | 15750 | 36000 |
| Total amine, meq./g. | 0.20 | 0.078 | 0.043 | 0.08 | 0.08 | 0.17 |
| Epoxide content, meq/g. | 3.89 | 4.77 | 5.02 | 3.75 | 4.81 | 4.28 |
| Weight per epoxide | 257 | 210 | 199.2 | 266.7 | 208 | 234 |

Each modified epoxy resin was prepared by the method described in Example 1a.
[1]EPONEX ® 1510 (Shell Chemical Co.) low viscosity, hydrogenated diglycidyl ethers of bisphenol A. Useful for producing non-yellowing, non-chalking outdoor weatherable coatings.
[2]Structure: O—[(CH$_2$CH$_2$O)$_A$(CH$_2$CH(CH$_3$)O)$_B$(CH$_2$CH(CH$_3$)NH$_2$)]$_2$
A = 20.9; B = 0.75
[3]Structure: CH$_3$O(CH$_2$CH$_2$O)$_A$ (CH$_2$CH(CH$_3$)O)$_B$CH$_2$CH(CH$_3$)NH$_2$
A = 18.6; B = 1.6
[4]Structure: H$_2$NCH(CH$_3$)CH$_2$—[OCH$_2$CH(CH$_3$)—]$_x$NH$_2$
x = 33.1

EXAMPLE IIb

| Properties of Coatings Prepared from Modified Epoxy Resins of Example IIa | | | | |
|---|---|---|---|---|
| | W | X | Y | Z |
| Formulation | | | | |
| A. Base Resin Mixture, pbw. | | | | |
| Modified epoxy resin - | | | | |
| A | 102 | — | — | — |
| B | — | 80 | — | — |
| E | — | — | 82 | — |
| C | — | — | — | 78 |
| Titanium dioxide | 35 | 30 | — | 30 |
| Water | 150 | 80 | 60 | 80 |
| Isopropanol | 10 | 10 | 10 | 10 |
| Nonionic defoamer[1] | 1.5 | 1.3 | 1.3 | 1.3 |
| B. Curative Mixture | | | | |
| Amidopolyamine[2] | 50 | 50 | 50 | 50 |

-continued

| Properties of Coatings Prepared from Modified Epoxy Resins of Example IIa | | | | |
|---|---|---|---|---|
| | W | X | Y | Z |
| Glycol ether[3] | 20 | 20 | 20 | 20 |
| Glycol ether acetate[4] | 10 | 10 | 10 | 10 |
| C. Water:isopropanol mix. (10:1 pbw.) | 200 | 100 | 130 | 50 |
| Properties of Coatings | | | | |
| Drying time, 5 mil (wet) film | | | | |
| Set-to-touch time, hrs. | 0.8 | 0.5 | 1.0 | 1.0 |
| Surface-dry time, hrs. | 7.9 | 7.0 | 7.0 | 7.7 |
| Thru-dry time, hrs. | 17.0 | 14.6 | 16.0 | 14.3 |
| Pencil hardness after: | | | | |
| 24 hrs. ~25° C. | 3B | 3B | 3B | 3B |
| 7 days, ~25° C. | 3B | 3B | HB | F |
| 60° gloss | 67.1 | 94.3 | 113.1 | 68.4 |
| Direct/reverse impact, in-lbs to fail | >160/>160 | >160/>160 | >160/>160 | 100/20 |
| Cure: 7 days ~25° C. | | | | |
| Water resistance, pencil hardness after immersion for 7 days, ~25° C. | 3B | 3B | — | 3B |

[1]BALAB ® 618 (Witco Chemical Co.)
[2]VERSAMID ® 140 (Henkel Corp., Resins Division)
[3]JEFFERSOL ® EB; ethylene glycol monobutyl ether (Texaco Chemical Co.)
[4]CELLOSOLVE ® acetate; glycol monoethyl ether acetate (Union Carbide)

EXAMPLE IIc

| Properties of Coatings Prepared from Modified Epoxy Resins of Example IIa | | | | | |
|---|---|---|---|---|---|
| | | M | N | O | P |
| Formulation | | | | | |
| A. Base Resin Mixture, pbw. | | | | | |
| Modified epoxy resin - | | | | | |
| B | | 100 | — | — | — |
| D | | — | 100 | — | — |
| E | | — | — | 100 | — |
| F | | — | — | — | 100 |
| Titanium dioxide | | 40 | 50 | 40 | 40 |
| B. Curative Mixture, pbw. | | | | | |
| Amidopolyamine[1] | | 50 | 56 | 61 | 54 |
| Glycol ether[2] | | 60 | 20 | 20 | 20 |
| Glycol ether acetate[3] | | 20 | 10 | 10 | 10 |
| Water | | 10 | 60 | 60 | 60 |
| Nonionic defoamer[4] | | 1.6 | 1.5 | 1.6 | 1.5 |
| C. Water:isopropanol mixture (10:1 pbw.) | | 100 | 100 | 100 | 100 |
| Properties of Coatings | | | | | |
| Drying time, 5-mil (wet) thickness | | | | | |
| Set-to-touch time, hrs. | | 1.5 | 1.3 | 1.7 | 1.5 |
| Surface-dry time, hrs. | | 3.0 | 7.0 | 5.8 | 5.4 |
| Thru-dry time, hrs. | | 5.4 | 11.4 | 16.8 | 12.6 |
| Direct/reverse impact, in-lbs. | | | | | |
| to fail after: 24 hrs. ~25° C. | | 120/100 | >160/>160 | >160/>160 | >160/>160 |
| 7 days ~25° C. | | 100/180 | >160/>160 | 160/24 | 160/160 |
| Pencil hardness after: | | | | | |
| 24 hrs. ~25° C. | | B | 3B | 3B | 3B |
| 7 days ~25° C. | | H | 2B | HB-F | 3B-2B |
| 60° gloss (cure: 7 days ~25° C.) | | 69.6 | 79.3 | 16.4 | 67.7 |
| Cross hatch adhesion (cure: 7 days ~25° C.) | | 100% | 100% | 100% | 100% |
| Water immersion hardness | | | | | |
| after immersion for: | 0 hrs. | H | 2B | HB-F | 2B-3B |
| (Cure: 7 days ~25° C.) | 2 hrs. | 3B | 3B | — | — |
| | 24 hrs. | 3B | 3B | B | 3B |
| | 7 days | 3B | 2B | HB | 3B |
| after immersion for | 0 hrs. | H | HB | H | F |
| (Cure: 7 days ~25° C.) | 2 hrs. | H | B-HB | — | — |
| ½ hr. 125° C. | 24 hrs | F | 3B | F-H | HB |

-continued
Properties of Coatings Prepared from Modified Epoxy Resins of Example IIa

|  | M | N | O | P |
|---|---|---|---|---|
| 7 days | HB | 3B | F | HB |

[1]VERSAMID ® 140 (Henkel Corp., Resins Division)
[2]JEFFERSOL ® EB; ethylene glycol monobutyl ether (Texaco Chemical Co.)
[3]CELLOSOLVE ® acetate; ethylene glycol monoethyl ether acetate (Union Carbide)
[4]BALAB ® 618 (Witco Chemical Co.)

The principle of the invention and the best mode contemplated for applying that principle have been described. It is to be understood that the foregoing is illustrative only and that other means and techniques can be employed without departing from the true scope of the invention defined in the following Claims.

What is claimed is:

1. An epoxy resin composition comprising:
   (A) a diglycidyl ether comprising a condensation product of
      (a) epichlorohydrin with
      (b) a bisphenol A type resin or derivative thereof
   which diglycidyl ether has been partially reacted with a polyoxyalkyleneamine of molecular weight of 900 to 5000; and
   (B) a reactive polyamidopolyamine prepared from reaction of multi-functional carboxylic acids, esters, anhydrides and mixtures thereof with a polyfunctional amine selected from the group consisting of aliphatic, cycloaliphatic and aromatic polyfunctional amines and mixtures thereof.

2. The composition of claim 1 wherein (A)(b) the bisphenol A type resin is 2,2-bis(p-hydroxy phenyl)propane.

3. The composition of claim 1 wherein the diglycidyl ether has been reacted with from 5 wt% to 50 wt% of the polyoxyalkyleneamine.

4. The composition of claim 1 wherein the diglycidyl ether has been reacted from 5 wt% to 15 wt% of the polyoxyalkyleneamine.

5. The composition of claim 1 wherein in (A)(b) the polyoxyalkyleneamine is a block copolymer of ethylene oxide and propylene oxide terminated with primary amino groups and is a monoamine or diamine.

6. The composition of claim 1 wherein in (A)(b) the polyoxyalkyleneamine is of the general formula:
$H_2N[CH(CH_3)CH_2O]_y(CH_2CH_2O)_z[CH_2CH(CH_3)O]_{y-1}CH_2CH(CH_3)NH_2$.

7. The composition of claim 1 wherein in (A)(b) the polyoxyalkyleneamine is of the general formula:
$H_2N[CH(CH_3)CH_2O]_y(CH_2CH_2O)_z[CH_2CH(CH_3)O]_{y-1}CH_2CH(CH_3)NH_2$ and has a molecular weight of from 1000 to 2000.

8. The composition of claim 1 wherein in (A)(b) the polyoxyalkyleneamine is of the average formula:

$O-[(CH_2CH_2O)_{20.9}(CH_2CH(CH_3)O)_{0.75}(CH_2CH(CH_3)NH_2)]_2$.

9. The composition of claim 1 wherein in (A)(b) the polyoxyalkyleneamine is of the general formula:

$CH_3O(CH_2CH_2O)_r[CH_2CH(CH_3)O]_sCH_2CH(CH_3)NH_2$ wherein r is an integer of from 16 to 20 and s is an integer of from 1 to 5 and has a molecular weight of from 900 to 1100.

10. The composition of claim 1 wherein in (A)(b) the polyoxyalkyleneamine is of the average formula:

$CH_3O(CH_2CH_2O)_{18.6}[CH_2CH(CH_3)O]_{1.6}CH_2CH(CH_3)NH_2$.

11. The composition of claim 1 wherein in (A)(b) the polyoxyalkyleneamine is a polyoxypropyleneamine.

12. The composition of claim 1 wherein in (A)(b) the polyoxyalkyleneamine is of the average formula:
$H_2NCH(CH_3)CH_2-[OCH_2CH(CH_3)-]_{33.1}NH_2$.

13. The composition of claim 1 wherein in (B) the carboxylic acids, esters or anhydrides have from 18 to 54 carbon atoms and from 2 to 3 carboxyl groups.

14. The composition of claim 1 wherein in (B) the polyamidopolyamine is the condensation product of a dimer fatty acid and diethylene triamine.

15. The composition of claim 1 wherein in (B) the polyamidopolyamine is the condensation product of one mole of dimer fatty acid and two moles of triethylenetetramine.

* * * * *